United States Patent [19]

Neuwirth

[11] Patent Number: 4,907,263
[45] Date of Patent: Mar. 6, 1990

[54] DRAIN GROUND FOR TELEPHONE CONNECTOR BLOCKS

[75] Inventor: Helmuth Neuwirth, Garden City, N.Y.

[73] Assignee: Porta Systems Corp., Syosset, N.Y.

[21] Appl. No.: 344,751

[22] Filed: Apr. 28, 1989

[51] Int. Cl.[4] ............................................. H04M 3/00
[52] U.S. Cl. .................................... 379/326; 379/327; 439/817; 439/788; 439/841
[58] Field of Search ............... 379/327, 328, 330, 331, 379/332, 326; 439/816, 817, 840, 841, 788

[56] References Cited

U.S. PATENT DOCUMENTS

| | | | |
|---|---|---|---|
| 1,259,752 | 3/1918 | Laird | 439/841 |
| 3,104,926 | 9/1963 | Scoville | 439/817 |
| 4,761,811 | 8/1988 | Zetena, Jr. | 379/397 |

Primary Examiner—James L. Dwyer
Attorney, Agent, or Firm—Charles E. Temko

[57] ABSTRACT

A drain ground structure for use with telephone connector blocks interconnecting shielded conductor pairs in installations requiring maximum noise and induced current suppression. The structure includes an elongated coil spring capable of frictional engagement with the ground wire of the shielded conductor cable between adjacent convolutions. To prevent the development of induced current in the spring itself, a metallic shorting bar is positioned parallel to the axis of the spring, the bar having lanced tabs which extend laterally from the plane of the bar and are engaged between the convolutions of the spring at periodic intervals.

3 Claims, 2 Drawing Sheets

FIG. 1.
FIG. 2.
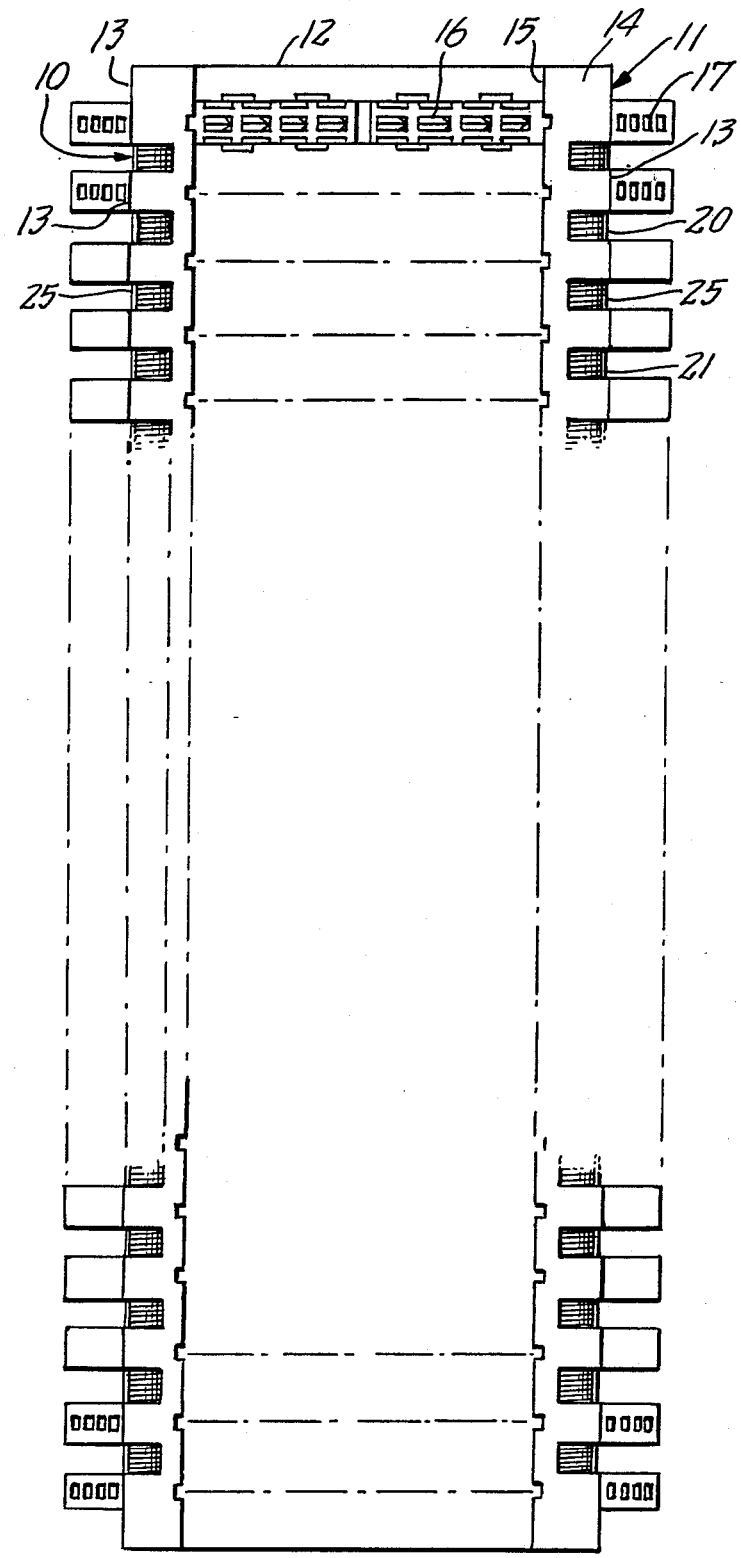
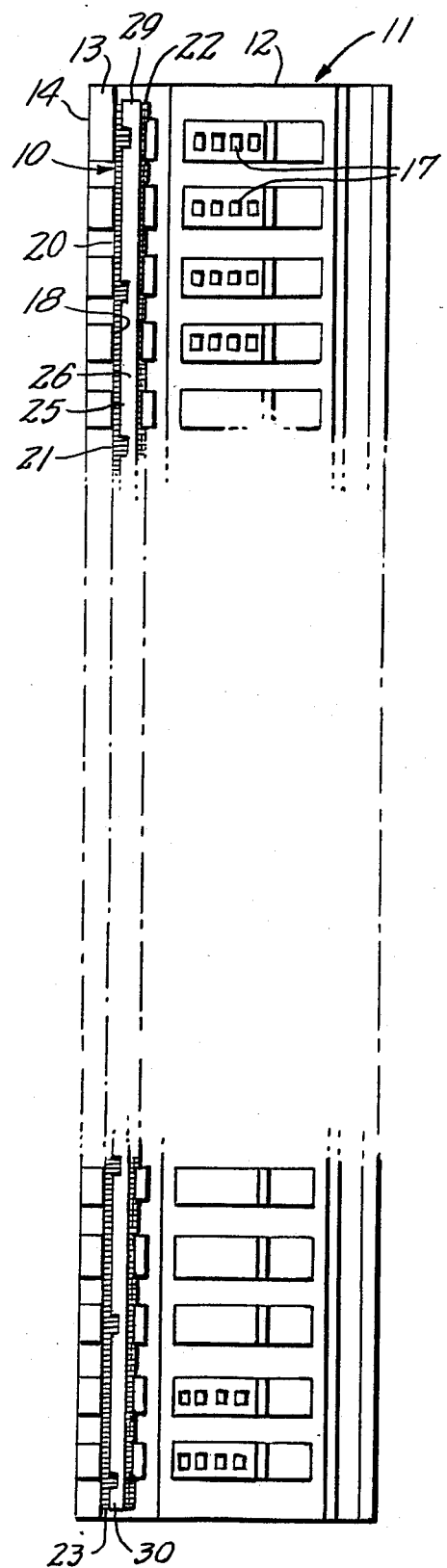

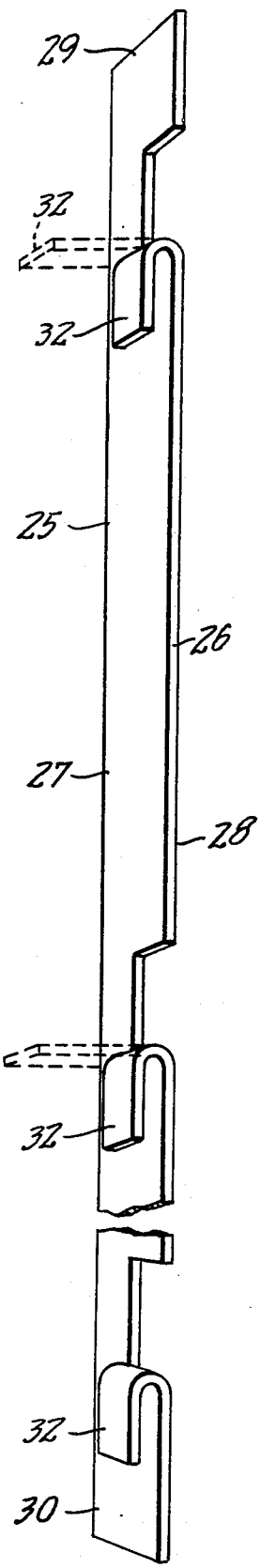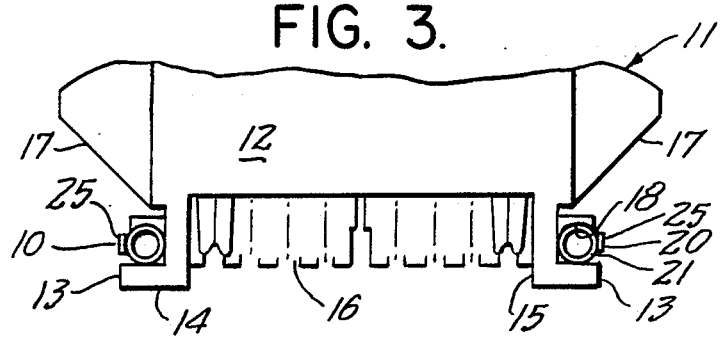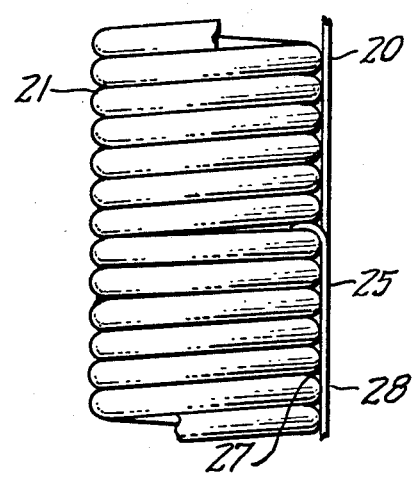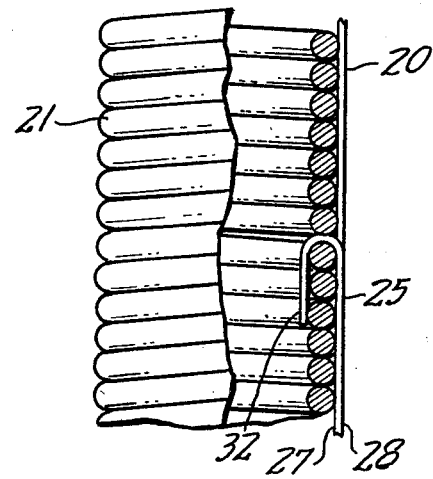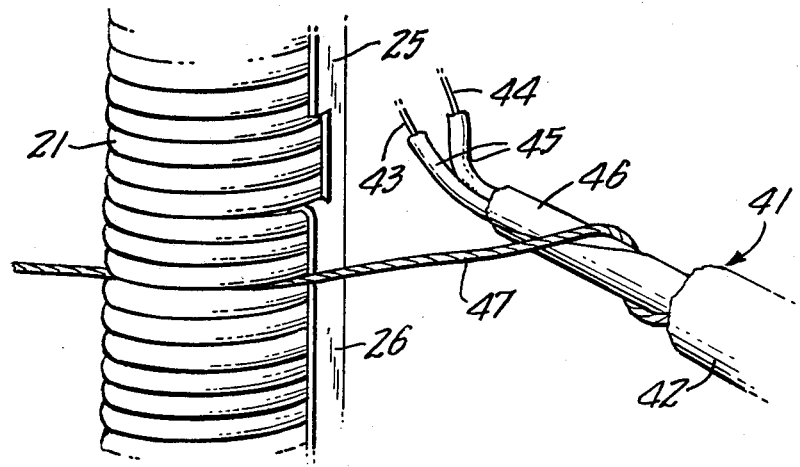

DRAIN GROUND FOR TELEPHONE CONNECTOR BLOCKS

BACKGROUND OF THE INVENTION

This invention relates generally to the field of telephony, and more particularly to an improved connector block construction incorporating a drain ground means for grounding the shield element of a shielded subscriber pair cable interconnected therewith.

With the increased use of subscriber lines for the purpose of data transmission, as distinguished from voice transmission, there has arisen an increased need to eliminate extraneous noise from such lines, normally caused by induced currents. Most efforts in this direction having included the use of individual shielded subscriber pair cables in which the individual subscriber pair conductors are wrapped in a shield of metallic foil or braided metal, about which a ground conductor is spirally wound.

Where the cable terminates at a connector block, it is necessary to provide a means for interconnecting the above-mentioned ground conductor to a source of ground potential in order that stray induced currents be eliminated. This so-called drain ground is particularly necessary where the involved connector block is not provided with individual subscriber circuit protection in the form of a protector module or the like. It is also necessary because the grounding terminals normally provided for current for shielded conductors.

SUMMARY OF THE INVENTION

Briefly stated, the invention contemplates the provision of an improved drain ground connection in the form of an elongated coil spring carried by the connector block at a location adjacent the interconnection of the shielded subscriber pair cable to corresponding terminals on the connector block. At such locations, the subscriber pair conductors are passed through wire guides on the block, and the ground wire is engaged between convolutions on the coil spring, one end of which is appropriately grounded to the supporting main frame. To prevent the generation of induced currents within the spring itself, a shorting bar or strip is positioned parallel to the axis of the spring, the strip having laterally extending tabs at periodic intervals which project to engage the spring between adjacent convolutions.

BRIEF DESCRIPTION OF THE DRAWING

In the drawings, to which reference will be made in the specification, similar reference characters have been employed to designate corresponding parts throughout the several views.

FIG. 1 is a front elevational view of a telephone connector block embodying the invention.

FIG. 2 is a side elevational view thereof.

FIG. 3 is a fragmentary top plan view thereof.

FIG. 4 is a view in elevation showing a drain spring shorting bar forming a part of the assembly shown in FIG. 5 in detached condition.

FIG. 5 is a view in elevation showing a part of a coil spring assembly forming part of the disclosed embodiment.

FIG. 6 is an elevational view partly in section corresponding to that seen in FIG. 5.

FIG. 7 is a view in perspective of a shielded subscriber pair cable used in conjunction with the connector block illustrated in FIG. 1.

DETAILED DESCRIPTION OF THE DISCLOSED EMBODIMENT

In accordance with the invention, the device, generally indicated by reference character 10 is illustrated in FIGS. 1 and 2 in mounted condition upon a known telephone connector block 11 of generally rectangular configuration. The block 11 is bounded by an upper wall 12, side walls 13, and a front wall 14 defining a recess 15 accommodating plural insulation displacement contacts 16 arranged in rank and file. At the meeting of the side wall with the front wall are integrally molded wire guides 17 which conduct individual subscriber pair wires for engagement with the contacts 16. Adjacent the wire guides 17 and in parallel mutual relation are elongated recesses 18 forming retention means.

Disposed within the recesses 18 are elongated coil spring assemblies 20, each including a coil spring 21 having first and second ends 22 and 23, one of which is connected to a source of ground potential. This is most conveniently accomplished by providing a narrow gauge wire leading to a metallic member on the main frame (not shown) which mounts the block 11.

Disposed parallel to the springs 21 are elongated shorting bars 25 of conductive metal, preferably in the form of a thin brass strip approximately 0.010 inches thick, and preferably tin plated to resist oxydation. The bars 25 include a planar main body 26 bounded by inner and outer surfaces 27 and 28 and first and second ends 29 and 30. At approximately three-quarter inch intervals, there are provided plural bent out tabs 32 which lie in planes perpendicular to the plane of the body 26. The bars 25 are maintained in juxtaposed parallel position with respect to the springs 21 by engagement of the tabs 32 between the convolutions of the springs.

FIG. 7 illustrates a known typical shielded single pair cable generally indicated by reference character 41, the cable including an outer insulative covering 42, first and second conductors 43 and 44 comprising the subscriber pair, each of which is provided with an insulative covering 45. Surrounding the conductors and 44 is a metallic foil wrapper 46 which serves as a shield, which is maintained in place by a spirally wound ground conductor 47 electrically communicating therewith.

During the connection of the cable 41, the conductors 43 and 44 are fed through corresponding wire guides 17 and interconnected to the terminals 16 in known manner. The ground conductor 47, which is normally provided without an insulative covering, is engaged between juxtaposed convolutions of the spring 21 at points between the tabs 32.

The shorting bar 25 is necessary for proper operation due to the fact that stray currents which are grounded through the ground conductor 47 upon traveling through the convolutions of the spring, may induce currents within the spring which would complicate the grounding of such currents. By conducting such currents to various portions of the spring through the tabs 32, such induced currents are quickly dissipated for subsequent conduction to the source of ground potential.

It may thus be seen that we have provided novel and highly useful improvements in drain grounding construction for telephone connector blocks particularly suited for use in interconnecting shielded single pair telephone cables, wherein stray currents carried by such cables are immediately conducted to a source of ground potential before they reach the connector terminals on the block. With minor modification, the grounding means is also suitable for use with multi-pair cables as well. The grounding means comprises, in essence, a conventional coil spring and a simple stamping of brass or brass alloy which forms a shorting bar, the bar providing its own means for attachment to the spring.

We wish it to be understood that we do not consider the invention to be limited to the precise details of structure and set forth in this specification, for obvious modifications will occur to those skilled in the art to which the invention pertains.

We claim:

1. In a telephone connector block having an exposed surface mounting plural electric contacts and side surfaces bordering said exposed surface, said side surfaces including wire guide means and elongated mounting means, the improvement comprising: improved drain ground means for use with individual shielded subscriber pair cables, said cables including a ground wire; said drain ground means including an elongated coil spring of length corresponding to the length of said side surfaces engaging said elongated mounting means, and having first and second ends, one end of said spring being interconnected to a source of ground potential; said coil spring having plural convolutions defining a continuous spiral interstice therebetween for the reception and frictional retention of the ground wire of said cables.

2. The improvement set forth in claim 1, further comprising an elongated conductive shorting bar having plural laterally extending tabs engaged within said spiral interstice.

3. An improved drain ground spring for use with telephone connector blocks and interconnected individual shielded subscriber pair cables comprising: an elongated coil spring forming a continuous spiral interstice, and an elongated conductive shorting bar; said shorting bar having laterally extending tabs thereon engaged with said spiral interstice at spaced intervals therealong.

* * * * *